(12) United States Patent
Lilienthal et al.

(10) Patent No.: US 9,756,096 B1
(45) Date of Patent: Sep. 5, 2017

(54) METHODS FOR DYNAMICALLY TRANSMITTING SCREEN IMAGES TO A REMOTE DEVICE

(71) Applicants: Benjamin Howard Lilienthal, San Francisco, CA (US); Eugene Abovsky, San Francisco, CA (US)

(72) Inventors: Benjamin Howard Lilienthal, San Francisco, CA (US); Eugene Abovsky, San Francisco, CA (US)

( * ) Notice: Subject to any disclaimer, the term of this patent is extended or adjusted under 35 U.S.C. 154(b) by 0 days.

(21) Appl. No.: 14/968,648

(22) Filed: Dec. 14, 2015

Related U.S. Application Data

(60) Provisional application No. 62/191,661, filed on Jul. 13, 2015.

(51) Int. Cl.
    *H04L 12/28*    (2006.01)
    *H04L 29/06*    (2006.01)
    *H04L 29/08*    (2006.01)
    *H04J 1/16*     (2006.01)

(52) U.S. Cl.
    CPC .......... *H04L 65/403* (2013.01); *H04L 67/02* (2013.01); *H04L 67/42* (2013.01)

(58) Field of Classification Search
    USPC .................................. 370/401, 386, 352
    See application file for complete search history.

(56) References Cited

U.S. PATENT DOCUMENTS

| | | | |
|---|---|---|---|
| 6,728,753 B1* | 4/2004 | Parasnis | G06Q 10/109 709/203 |
| 2002/0120939 A1* | 8/2002 | Wall | G06F 17/30017 725/87 |
| 2015/0039998 A1* | 2/2015 | Lieb | G06F 17/30899 715/234 |
| 2016/0004820 A1* | 1/2016 | Moore | G06F 19/321 705/3 |

* cited by examiner

*Primary Examiner* — John Pezzlo
(74) *Attorney, Agent, or Firm* — Evan R. Smith

(57) ABSTRACT

A system and method are provided for conducting an electronic meeting by broadcasting a screen image to a third party computing device (desktop, laptop, tablet or smartphone) without requiring the attendee to download specialized software. The image is viewed through a standard web browser. In operation, a user is provided with a hosting account on a server, and a host computing device is loaded with a software application for communicating with the server. The user invites one or more remote viewers who connect to the server using the browser on their device. The hosting application captures image frames to be shared and divides them into subsections, transmitting to the server only those sections that have changed relative to the previously transmitted frame. The meeting attendee's browser retrieves tiles from the server as they change, and displays them for the attendee.

20 Claims, 6 Drawing Sheets

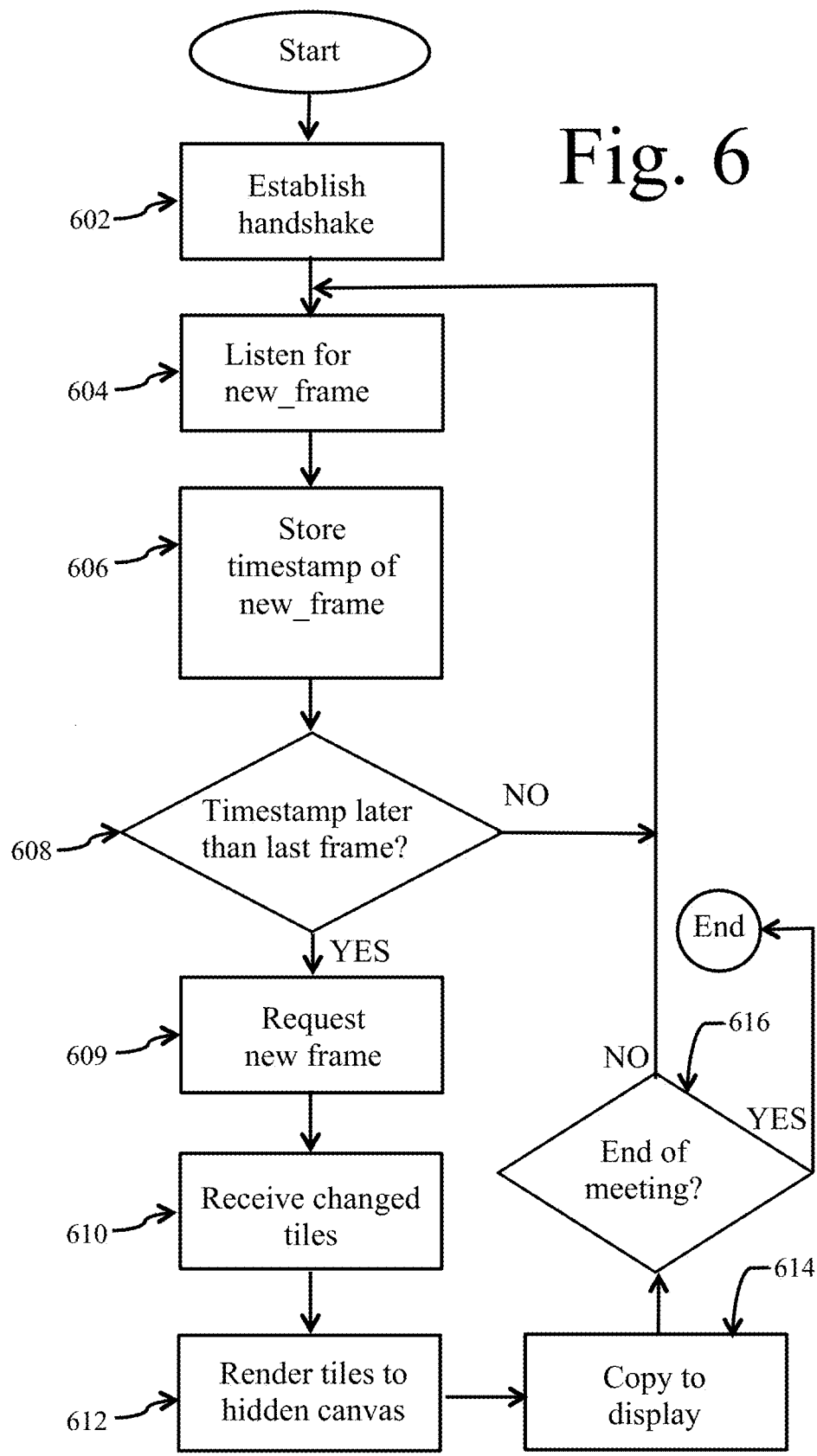

METHODS FOR DYNAMICALLY TRANSMITTING SCREEN IMAGES TO A REMOTE DEVICE

This application claims the benefit of U.S. Provisional Patent Application 62/191,661, filed Jul. 13, 2015, titled "Systems and Methods for Remote Presentation," the entire disclosure of which is incorporated herein by reference.

TECHNICAL FIELD

The present invention is directed to displaying information from a first computing device on the screen of a second computing device, to enable shared browsing, presentations, application sharing, and the like.

BACKGROUND ART

Sales, training, and other presentations are often conducted electronically via the internet, or using an internet data connection and a telephone link. Typically these conferences are accomplished using a web service and an application that both the host and remote viewed must install on their computer in preparation for the discussion, such as GoToMeeting™.

The advantages of electronic meetings are clear; conventional electronic meeting technologies make it possible to present an effective audio-visual sales presentation, training session, or other message to a remotely located person without traveling to the viewer's location, thus saving time and money.

However, because the viewing party normally must install a specific proprietary application before participating in an electronic meeting, difficulties arise, such as software incompatibilities with available computers or devices, and inability of the attendee to load the meeting software due to lack of technical ability or lack of administrative authorization. In general, conventional approaches have not provided any convenient method for easily and rapidly giving a presentation that can be viewed on almost any device, including smartphones and tablets, without advance preparation and regardless of the viewing device's size or its compatibility with a proprietary software application.

Therefore, the inventors have determined that there is a need for improved systems and methods for remotely presenting information from a device screen.

DISCLOSURE OF THE INVENTION

In an example embodiment, techniques for improved methods of sharing screen views, browsers, and application functions with a person at another location are implemented using a novel server system. In particular embodiments, the disclosed system provides a method for conducting an electronic meeting by broadcasting an image of a desktop or application to a third party computing device (desktop, laptop, tablet or smartphone) without requiring the attendee to download specialized software. The image is viewed through a standard web browser (for example, Chrome, Firefox, or later versions of Internet Explorer).

In the system and method disclosed, a user is provided with a hosting account on a server, and a host computing device is loaded with a software application for communicating with the server. The user can then invite one or more remote viewers by providing instructions and access information, such as a username or password or both, to person(s) who want to remotely view the user's screen, window, or presentation. The person connects to the server, typically by using an ordinary browser operating on a remote view computing device in the possession of the remote viewer. The server provides an executable script to the browser in response to access by the browser defining an interaction with the server.

During the presentation, the hosting application captures image frames from the screen portion that is to be shared. The frame area to be transmitted is divided into an N×K grid, for example, a 10×10 grid defining an array of 100 tiles. The hosting application then transmits image information in the grid tiles to the server, but only for those tiles that have changed since the previous frame. This approach minimizes bandwidth requirements for the transmission and for reception by the meeting participants. The hosting application waits for the server to confirm receipt of the changed image before sending subsequent frames. The meeting attendee's browser retrieves tiles from the server as they change, and displays them for the attendee.

The transmitted frames are cached in storage along with their timestamps. The remote viewing browser provides information to the server about the viewer's screen size and the last confirmed time stamp when image data was received by the viewer. The host application can obtain this information from the server and use it to display a simulated version of the remote viewer's output. This allows the presentation host to monitor what the viewer sees on his screen in real time.

BRIEF DESCRIPTION OF THE DRAWINGS

The accompanying drawings, which are incorporated herein and form a part of the specification, illustrate various exemplary embodiments of the present invention and, together with the description, further serve to explain various principles and to enable a person skilled in the pertinent art to make and use the invention.

FIG. 6 is a flow chart of a preferred embodiment of a process for operating a browser to efficiently receive image tile updates from a server.

BEST MODE FOR CARRYING OUT THE INVENTION

Figure 1:
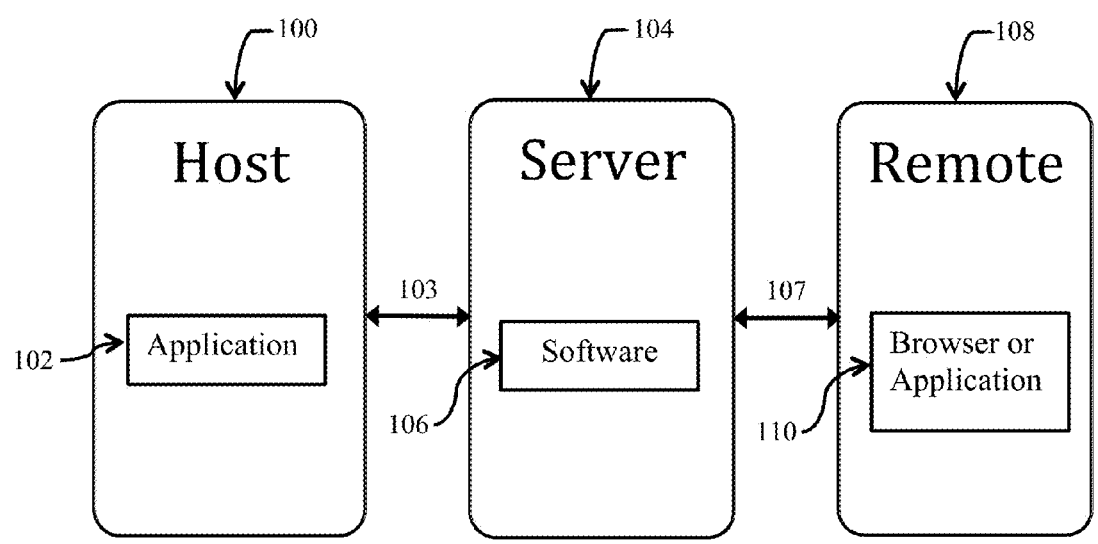
FIG. 1 is a block schematic diagram showing an example embodiment.

The present invention will be described in terms of one or more examples, with reference to the accompanying drawings.

The present invention will also be explained in terms of exemplary embodiments. This specification discloses one or more embodiments that incorporate the features of this invention. The disclosure herein will provide examples of embodiments, including examples from which those skilled in the art will appreciate various novel approaches and features developed by the inventors. These various novel approaches and features, as they may appear herein, may be used individually, or in combination with each other as desired.

In particular, the embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, persons skilled in the art may implement such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g. a computing device). For example, a machine-readable medium may include read only memory (ROM); random access memory (RAM); hardware memory in hand-held computers, PDAs, smart phones, and other portable devices; magnetic disk storage media; optical storage media; thumb drives and other flash memory devices; electrical, optical, acoustical, or other forms of propagated signals (e.g. carrier waves, infrared signals, digital signals, analog signals, etc.), Internet cloud storage, and others. Further, firmware, software, routines, instructions, may be described herein as performing certain actions. However, it should be appreciated that such descriptions are merely for convenience and that such actions in fact result from computing devices, processors, controllers or other devices executing the firmware, software, routines, instructions, etc.

An example embodiment of the present invention provides the ability to broadcast an image of a desktop or application to a third party computing device (desktop, laptop, tablet or smartphone) without requiring the attendee to download specialized software. The image is viewed by the attendee through a standard web browser (for example, Chrome, Firefox, or later versions of Internet Explorer).

In a preferred embodiment, the system provides the host with significant information about the attendees' viewing experience, including the speed of their connection and the size of their viewing window. This information is obtained from the browser by the server and made available to the host application for display to the host. This information provides the presenter with an understanding of the attendee's experience that was unavailable in prior art products and services.

As an example, embodiments disclosed herein are particularly useful to inside sales representatives for performing product demos from their desktop to prospective clients who do not have the time or technical literacy to download existing web conferencing solutions to see the product demo.

FIG. 1 is a block schematic diagram showing an implementation of an example embodiment. As shown in FIG. 1, a host computing device 100 is supplied with a desktop Client/Mobile application 102. Application 102 obtains display information from host computing device 100 as desired by the user to transmit the display information for viewing by another person, as will be described in more detail herein.

A server 104 is connected via a communications network 103, such as the internet, to host computing device 100. Server 104 is provided with software 106 to perform user account maintenance and control, image transmission, and process management functions that will be described in further detail herein.

A remote-view computing device 108 is connected via a communications network 107, such as the Internet, to server 104. Remote-view computing device 108 is provided with an HTML5 viewer application 110. Viewer application 110 can be a function-specific viewing application, but preferably is a conventional HTML5-capable web browser with appropriate standard plug-ins.

Communications networks 103 and 107 can be the same or different networks. Each network can be any type of known network, including without limitation a local wired or wireless network, a private network, or a public network such as the Internet.

Figure 2:
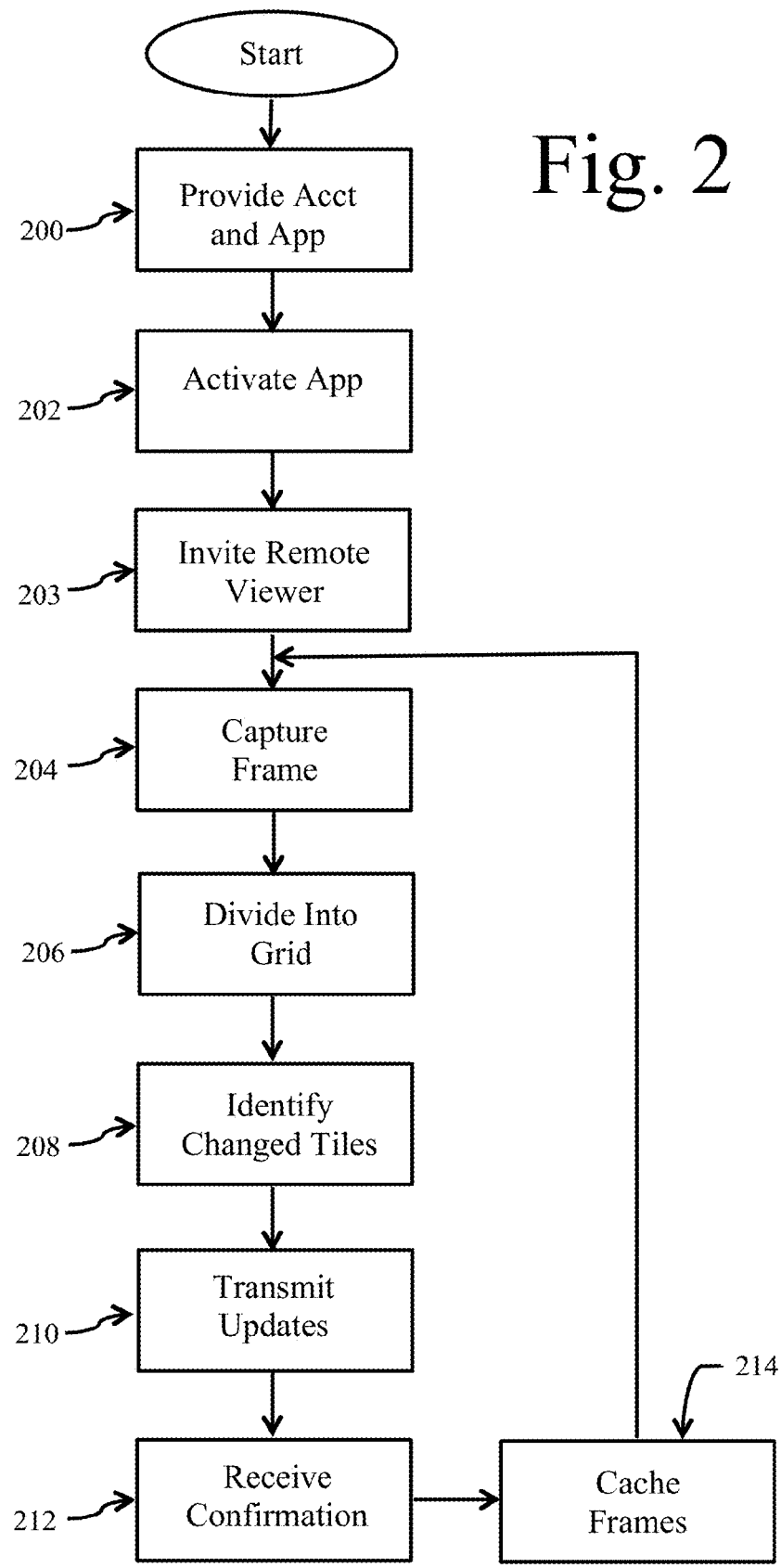
FIG. 2 is a flow chart showing a process for transmitting screen display information to enable remote viewing according to an example embodiment.

The process of transmitting an image from computing device 100 to remote view computing device 108 using the example embodiment system and methods will now be described in detail. FIG. 2 is a flow chart showing an example embodiment of an operating process using the system shown in FIG. 1.

Initially, in step 200, the user (for example, a meeting host) is provided with a hosting account and the user's host computing device 100 is provided with software application 102. In an embodiment, the hosting account is created online by the user of host computing device 100 and software application 102 is downloaded into host computing device 100. As an example, these functions may be performed by the user at an Internet website operated by a service provider that also operates server 104.

In step 202, the account and software are activated so that the host user can proceed to use the host software application 102 on host computing device 100 to transmit a presentation or other screen images to another person.

In step 203, the host user invites one or more remote viewers to attend an electronic meeting or otherwise share screen images and access. The host user may provide instructions and access information, such as a username or password or both, to the person(s) who want to remotely view the user's screen, window, or presentation. For simplicity, the example embodiment will be described in terms of a single remote viewer, but it should be understood that the inventors contemplate that any number of viewers can simultaneously receive the same presentation or other screen images. The person wishing the view the host's screen signs in to server 104, using viewer application 110 (typically a browser) operating on remote view computing device 108. Server 104 provides an executable script to the browser in response to access by the browser (for example, in HTML5, Java, or other standard scripting language available in the browser) defining an interaction with the server that produces the viewing process that is described in detail herein.

In the example embodiment, hosting application 102 performs a process loop during the period where the host user desires to provide a remote display of the screen or window image. This loop begins with step 204, where hosting application 102 captures an image frame from the desktop or the window that is being shared. In an example embodiment, a conventional Node-Webkit API such as "ChooseDesktopMedia" may be used to obtain a video stream of the host's desktop.

Next, in step 206, the frame is divided into an N×K grid by hosting application 102. N and K may be varied based on functional considerations, for example, the proportions of the host screen or window, the resolution of the host screen or window, the size, resolution, or speed characteristics of one or more remote display devices, and network bandwidth and other network performance characteristics. The inventors have determined that a 10×10 grid provides good functionality in many cases. The example embodiment will therefore be described in terms of a 10×10 grid (defining an array of 100 "tiles") although it will be understood that other values of N and K can be selected to optimize functions for particular host, remote device, and network characteristics.

In step 208, each grid tile is compared to the tile from the previous frame. In processing the first frame received, the frame is compared to a blank "previous frame" memory so all of the tiles will register as having changed.

In step 210, image information for any changed tiles is transmitted to the server. For the first frame processed, the entire image will be transmitted to the server for display on the remote device. For subsequent frames, only image data in those areas of the screen where the image has changed will be transmitted. This approach reduces bandwidth requirements and data usage since data will not be transmitted for static regions of the screen.

In step 212, the server confirms receipt by the server of the changed image content.

The confirmation of data receipt in step 212 as described herein acts as a natural bandwidth throttle, as the system preferably waits for the server to indicate receipt before new content is broadcast. This approach allows dynamic adjustment of the transmitted frame rate to accommodate the network bandwidth available to the host.

Figure 3:
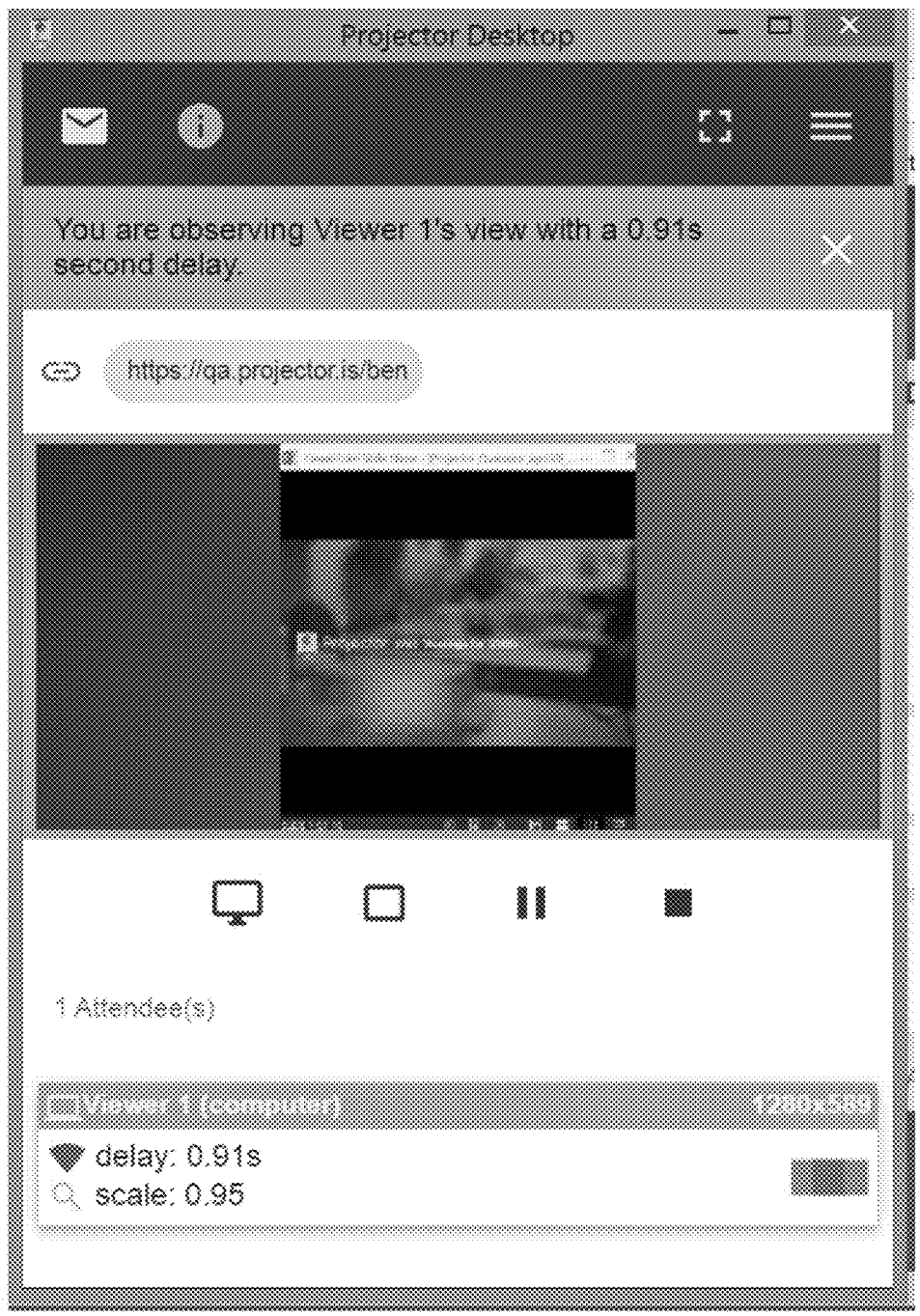
FIG. 3 is a screen image of an example embodiment of a host application showing remote viewer information features including remote screen view.

In a preferred embodiment, in step 214 the transmitted frames are cached in storage in the server along with timestamps applied by the server (or by the host software if desired). In an embodiment, the remote viewing browser provides to the server (either via standard functions or a script) information about the viewer's screen size, the last confirmed time stamp when image data was received, and any pan or zoom settings activated by the remote viewer. This information is transmitted to the host application, and possession of this information allows display of a simulated version of the remote viewer's output for the presentation host as part of the host application display. FIG. 3 shows a screen shot of an example embodiment of a display of the remote viewer's output in the host application.

Figure 4:
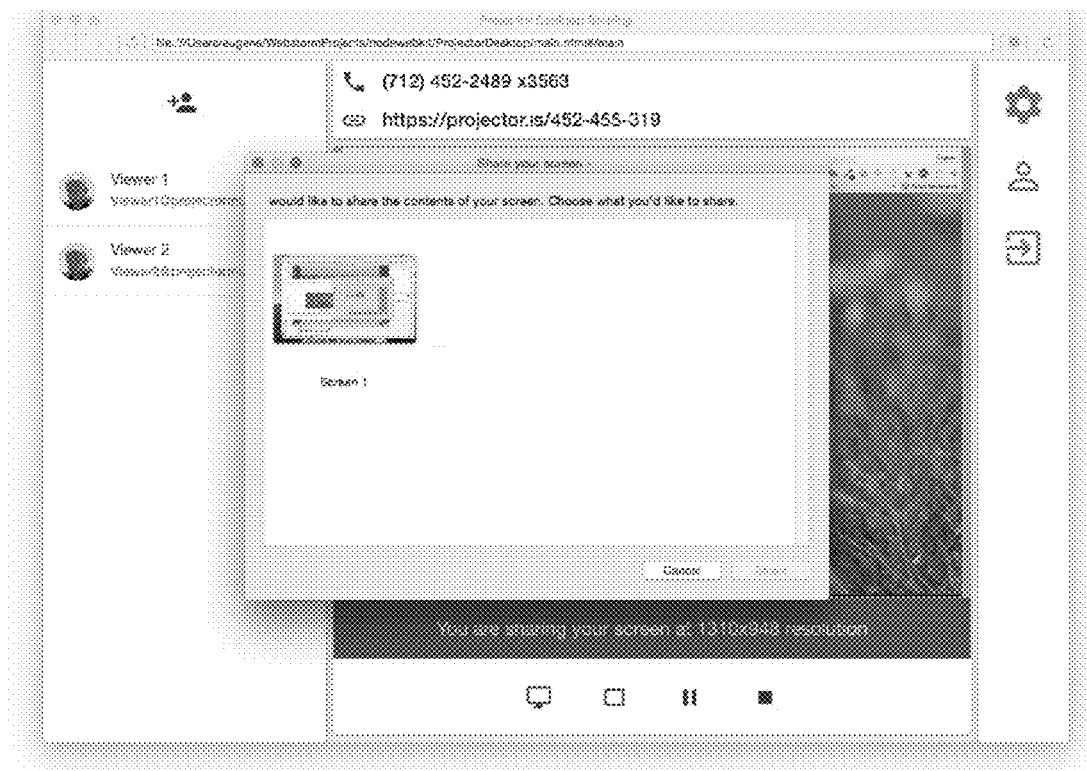
FIG. 4 is a screen image of an example embodiment of the host application showing functions for selecting a screen to be shared.
Figure 5:
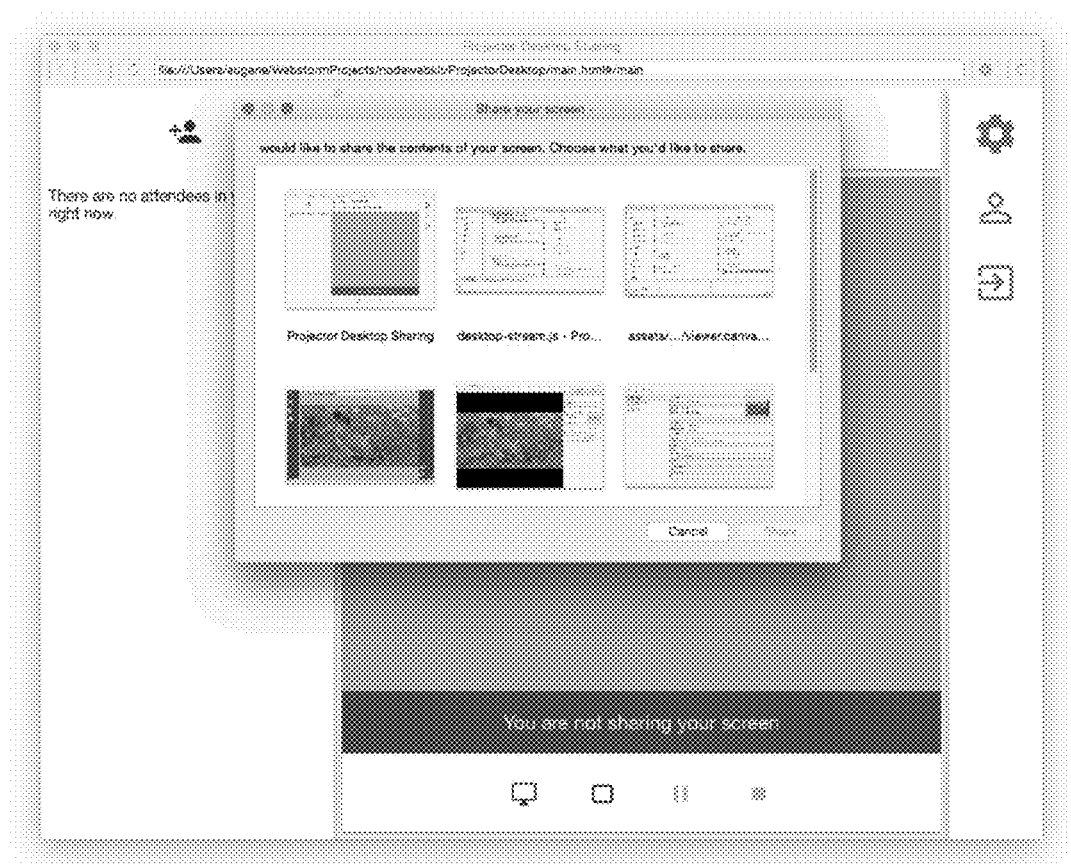
FIG. 5 is a screen image of an example embodiment of a Host Application Sharing Chooser.

Referring again to FIG. 1, in an embodiment, the software application 102 operating in host computing device 100 may provide a variety of functions. A "Meeting ID" is assigned to the host user and is displayed at the top of the screen. In the example embodiment, a "Share Your Desktop" function is provided that makes the host user's desktop visible to attendees (remote viewers). FIG. 4 shows the host screen for selecting a shared window or desktop. The example embodiment also provides "Share A Window" functions for sharing a single window with remote viewers rather than the entire desktop. FIGS. 4 and 5 show host screens provided for selecting a shared window or desktop.

A "Send Email Invite" function sends an email with a 1-Click Link to join a meeting as a remote viewer. In the example embodiment, it is also possible to give information verbally identifying the server site and the meeting ID as defined by the server and/or host application, and displayed in the application. In a further preferred embodiment, the Meeting ID can be customized as part of Main Menu/Meeting Settings functions. Typically a default Meeting ID may be assigned by the server, but the default may be modified upon host request. The host can preferably specify additional meeting requirements, such as requiring that the attendee puts in their name before joining the meeting, or password-protecting the meeting.

The function of displaying for the host what the remote viewer currently sees is, for example, activated by clicking on the binocular icon shown in the host application (FIGS. 3-5). This function is particularly useful to show which part of the image the remote viewer has zoomed into, and generally confirm that the remote user is looking at the right information.

In the example embodiment, the host application also includes an Audio Conference Call function. Preferably the application is integrated with an unlimited audio conference bridge. To enable the conference call, the host can dial the phone number provided and enter the conference ID and an activating code. Audio conferencing can be disabled, for conferences where this function is not desired, in the Meeting Settings function of the host application.

In a preferred embodiment, a version of the host application designed to work on mobile devices incorporates an embedded browser compliant with current industry standards. An embedded browser in the application simplifies the provision of co-browsing functionality with a remote viewer.

In a first group of embodiments, the host application runs on a personal computer, such as a PC or Apple desk or notebook computer. In these embodiments, the host application is designed to be compatible with the operating system available on the host computing device, such as MAC OS®, Microsoft Windows®, Linux, or others.

In a second group of embodiments, the host application runs on a smartphone, tablet, watch, or other small device operating system and is optimized for making presentations on a compact mobile device. For example, the host application may be designed to run under Apple iOS, various versions of the Android operating system, Windows Phone, BlackBerry, or other operating systems that become popular enough to warrant release of a custom version of the host application. Preferably, where practical, the host application includes a further "Share Application" feature when operating in a mobile platform. The "Share Application" feature allows the remote viewer to interact with a selected application operating on the host device.

A variety of additional features, including those specifically disclosed herein and those that will be apparent to persons skilled in the art upon review of this disclosure, are contemplated as within the scope of the present invention.

Examples of desirable additional operating features include a "knock to join" feature that allows the host to control access to the meeting by requiring authorization from the host before any new viewers joining the meeting can see the displayed information.

A "kick" feature allows the host to disable the access of any viewer, thus allowing removal of that person from the meeting.

A "pass control" feature allows the host to pass the controls for the host device to an attendee so that the attendee can provide input to the meeting, participate "hands on" in a demonstration being provided by making selections on the host's screen, make browser selections to "co-browse" with the host, or advance slides stored on the host device during a presentation. When control is passed, the attendee can make inputs via the browser on his device for execution on the host device. The "pass control" feature is preferably implemented to work for both mouse and touch driven devices and interfaces, for both the host and attendee. The host will be able to both delegate and revoke control of her screen to an attendee, as well as sharing joint control so that both the host and attendee selections, for example in co-browsing, are active. As another feature, the host is permitted to promote an attendee to host. The attendee can then display his screen to the host and others in the meeting and present information to the group.

A "host device switching" feature allows the host to transition between different devices during a meeting without interrupting the viewer's experience. For example, the host may switch between presenting using a PC and an android phone.

In a preferred embodiment, when using a computer such as a PC or Mac with a large display area, the host can elect to share their entire Desktop or limit the image transmission to a selected application window. When using an iOS-based device, the host is preferably provided with options to share web browsing, pictures and videos from the device, as well as documents accessible via iOS from the cloud such as iCloud, Dropbox, and other storage mechanisms.

Preferably the Android version of the hosting software is configured to allow sharing any content that is visible on the Android screen. This can be accomplished under Android version 5.0 or higher, similar to "sharing the desktop" from a PC. To achieve screen sharing from an Android device, an Android API is used to capture bitmap data that contains the image of the screen. The resulting bitmap is then divided into tiles and processed through the same screen synchronization algorithm as described herein for desktop screen sharing, allowing viewers to see the contents of the host's Android device's screen.

The software application 106 operating in server 104 maintains accounts for host users, and allows remote viewers authorized by a host user to sign in and view the host user's presentation. The server, while shown for simplicity as a single device in the example embodiment, can be implemented using multiple servers and the functions described herein for the server can be divided between different devices as desired. Further, if desired, any of the functions described as being performed by the host application or the server application in the example embodiments herein can be reassigned to the other device. For example, the host computing device could, if desired, periodically send full frame data to the server and the server could perform the analysis described herein to determine which tiles had changed, instead of this function being performed in the host application.

In the example embodiments, the server provides socket connections between the host's client application and the server, and the attendee's viewer application and the server respectively. These web sockets enable real-time communication.

In a preferred embodiment, the server transcodes the image data it receives from the host into multiple resolutions and compression qualities. When a client (remote viewer) connects to the server to view a presentation, the servers dynamically set an optimal resolution and compression rate based on the screen size of the remote device and its observed rate of acknowledging the transmission of data, indicating actual available throughput. This enables optimizing bandwidth while providing a high fidelity viewing experience. Resolution may be reduced or increased based on the size of the target screen. There is no benefit to sending images at a greater resolution than the remote user can display, so in a preferred embodiment, resolution is reduced for transmission of presentations to lower resolution target devices. Further, if acknowledgements of transmitted data are slow, indicating that there is a bandwidth limitation in the channel, the software application may increase compression of the image data to reduce the amount of data required to maintain substantially live frame updates. Those skilled in the art can determine desired thresholds for varying compression by observing the response of the remote device and tuning the data rate to provide a response that satisfies the viewers using the system.

In a preferred embodiment, the server performs an authentication handshake with the remote device when a viewer connects to a meeting in their web browser. In an embodiment, the host user can determine whether to require a password for viewing. In cases where a password is required, if the password is not in the URL of the meeting, the user must enter a password. A second authentication request with the password is made to the server and once authorized to join the meeting, the socket connection is established in the browser. This allows for the transmission of real-time data.

The server is then able to start transmitting tile data to the browser via the authenticated socket connection. The browser can then render and display the tile data with an HTML5 application that runs in its native JavaScript engine.

The script operating in association with the client browser makes a request to the server for tiles, which it then renders on the viewer's browser and converts into an image that is the representation of the host's content. The script may also provide zoom and pan functions to assist in viewing detailed images on smaller screens.

In an embodiment, the request from the client carries a timestamp for the last tile that it received from the server. On initial join, the time stamp is set to zero. On subsequent requests, the client indicates the last time it received content from the server. The server application is programmed to send only tiles that have changed since that time stamp. This approach lets the client optimizes its refresh rate to its available bandwidth.

In a preferred embodiment, the client script also sends back to the server the following information: Size of browser window, and settings for zoom and pan functions if they are provided and active. The server performs calculations on this information and provides the host with size and speed information relating to the attendee, as further illustrated in FIG. 3.

A preferred embodiment of a viewing browser interface to the server will now be described in further detail with reference to FIG. 6.

First, in step 602, the browser performs a handshake routine to establish a connection with the server back-end. A preferred example of an appropriate handshake algorithm is as follows:

1. The browser queries a REST API to get the IP address of the actual meeting server;
2. The browser establishes a socket connection to the designated meeting server;
3. The browser queries the meeting server to determine which kind of an authentication process is required to join the meeting. The server will respond with one of three options: (a) None (meeting is unsecured), (b) Password protected, or (3) Knock-to-join.
4. If no authentication is required, the browser is joined to the meeting.
5. If the meeting is password protected, the browser will prompt the user to enter the password. If the password is correct, the user will be joined to the meeting.
6. If the meeting is in "knock-to-join" mode, the host is notified that there is a user waiting to join the meeting, while the browser is showing the user a "waiting for host to respond" state. If the host accepts the user, the browser is then joined to the meeting.

Once the browser has joined the meeting, a continuous loop for processing received image data begins at step 604, where the browser starts listening for "new_frame" events from the server. A new frame event transmitted to the browser indicates that new image content is available on the server. This event also carries a time-stamp for the frame.

When a "new_frame" event is received, in step 606, the "last available frame" timestamp on the browser is set to that of the time-stamp received for the new_frame.

In step 608, the process determines whether the time-stamp associated with the last available frame is later than the timestamp associated with the last rendered frame. If so, the process continues with step 609, where the browser queries the server with a "get_frames" call which also carries a the "last rendered" time-stamp for that server. If the browser has already received the frame associated with the new_frame event, control returns to step 604 to await the next frame event.

In response to the frame request in step 609, in step 610 the browser receives changed tiles from the server. The server responds to the frame request by transmitting the set of tiles (sections of the host's screen image) that have changed since the time-stamp provided by the browser client. In other words, the server will respond by transmitting all the sections of the screen that have changed since the last time the browser client updated. Each tile object preferably consists of metadata providing positioning information (width, height, x offset, and y offset), and JPEG image data. The JPEG data is encoded in one of two encoding formats depending on the capabilities of the browser. For older browsers, the JPEG data is transmitted as base64 encoded (requiring slightly more bandwidth). For newer browsers that support the Blob API released by Mozilla (https://developer.mozilla.org/en-US/docs/Web/API/Blob), the data is transmitted in a more efficient binary format.

In step 612, each tile is rendered in the browser. In a preferred embodiment, the tiles are rendered to hidden HTML5 Canvas objects according to specifications provided by Mozilla (see https://developer.mozilla.org/en-US/docs/Web/HTML/Element/canvas). The tiles preferably have the same dimensions as the host's stream. The tile metadata is used to position the JPEG image of the tile in the correct position on the Canvas object.

After the tile image data is rendered onto the hidden canvas, in step 614 the final composed image from the hidden canvas object is copied over to a second canvas object that is used to display the image to the viewer in the browser. This second canvas will be referenced herein as the "display canvas." The display canvas is set to the same size as the viewer's browser window, and the image from the hidden canvas is scaled to fit onto the display canvas.

In step 616, if the process has not been cancelled (for example, at the end of the meeting, or when the viewer withdraws or is removed from the meeting), the processing loop restarts beginning with step 604. The processing loop maintains the browser's view in sync with what the host is presenting while minimizing latency.

While the display function is active, the end user can preferably use either the mouse, touch gestures, or button controls in the menu to manipulate the display canvas, and can zoom and pan the image on the display canvas.

When the passing control feature described herein is enabled, mouse and touch gesture events that happen on the display canvas are transmitted back to the server and then relayed back to the host. The host client will then translate those events into native device input commands.

Although illustrative embodiments have been described herein in detail, it should be noted and understood that the descriptions and drawings have been provided for purposes of illustration only and that other variations both in form and detail can be added thereto without departing from the spirit and scope of the invention. The terms and expressions in this disclosure have been used as terms of description and not terms of limitation. Thus, the breadth and scope of the present invention should not be limited by any of the above-described exemplary embodiments, but should be defined only in accordance with the claims and their equivalents. The terms and expressions herein should not be interpreted to exclude any equivalents of features shown and described, or portions thereof.

We claim:

1. A method for remotely displaying digital images to at least one viewer device, comprising the steps of:
   providing a server having a processor and communications ports, said server linked to provide a first data transfer connection to a presenter device;
   providing a second data transfer connection linked to said server, said second data transfer connection configured to communicate via a viewer communications channel with a browser installed on at least one viewer device;
   providing a script operating in association with said browser on a processor in said viewer device;
   providing presentation software for installation in said presenter device, where said software operates on a processor in said presenter device and enables an operator to select a series of one of more image frames to be transmitted to said at least one viewer device, then transmits said frames from said presenter device to said server;
   operating said processor in said server to establish said first and second data transfer connections in response to an indication that a presenter and viewer desire to interact, and then to receive said frames from the presenter software via said first data transfer connection and transmit said frames to the viewer device via said second data transfer connection, whereby the browser and script in the viewer device display the received frames on a display screen of the viewer device without requiring installation of a separate viewing application; and
   electronically receiving information from said viewer device indicating the frame displayed by the viewer device and selectively displaying on the presenter device a monitor image of the frame currently displayed on said viewer device.

2. The method of claim 1 wherein the image frames are transmitted contemporaneously to a plurality of viewer devices that use different browsers to receive and view the transmission.

3. The method of claim 1 including the further step of providing a voice channel connection that digitally transmits voice communications between the presentation software and the viewer device via a conference bridge.

4. The method of claim 1 wherein the presenter software is provided in versions supporting MacOS, iOS, Android, and Microsoft Windows.

5. The method of claim 1 including the further step of configuring the presenter software to receive instructions from a viewer device for displaying frames, whereby the presenter may selectively delegate control of a presentation to a viewer.

6. The method of claim 1 including the further step of configuring the presenter software to display on the viewer device an application operating on the presenter device, and to receive control inputs from the viewer device via the server, whereby a viewer using the viewer device may interact with the application operating on the presenter device.

7. The method of claim 1 including the further steps of:
electronically receiving information from the viewer device specifying its available screen size and resolution; and
electronically processing image frames received in the server with a first resolution to generate a second, different resolution compatible with the viewer device and transmitting the frames to the viewer device in said second resolution.

8. The method of claim 7 wherein the server dynamically monitors the viewer device rate of acknowledging the transmission of data, and varies at least one of the compression and resolution of the frames transmitted to the viewer device to compensate for bandwidth limitations.

9. A method for remotely displaying digital images to at least one viewer device, comprising the steps of:
providing a server having a processor and communications ports, said server linked to provide a first data transfer connection to a presenter device;
providing a second data transfer connection linked to said server, said second data transfer connection configured to communicate via a viewer communications channel with a browser installed on at least one viewer device;
providing a script operating in association with said browser on a processor in said viewer device;
providing presentation software for installation in said presenter device, where said software operates on a processor in said presenter device and enables an operator to select a series of one of more image frames to be transmitted to said at least one viewer device, then transmits said frames from said presenter device to said server, said software further configured so that during transmission of an image frame, the software identifies a condition where only a subset of that frame has changed relative to the last frame transmission, and if so, transmits as the next frame only said changed subset of said frame;
operating said processor in said server to establish said first and second data transfer connections in response to an indication that a presenter and viewer desire to interact, and then to receive said frames from the presenter software via said first data transfer connection and transmit said frames to the viewer device via said second data transfer connection, whereby the browser and script in the viewer device display the received frames on a display screen of the viewer device without requiring installation of a separate viewing application; and
electronically requesting acknowledgement from said viewer device of receipt of each frame, storing a record of frames acknowledged by said viewer device, and selectively displaying on the presenter device a monitor image of the currently displayed frame on said viewer device.

10. The method of claim 9 wherein the script provided to said viewer device reports to the server indicating panning of the displayed frame on the viewer device, and the displayed monitor image reflects the portion of the frame visible on the viewer device as a result of said panning.

11. The method of claim 9 wherein the script provided to said viewer device reports to the server indicating zooming of the displayed frame on the viewer device, and the displayed monitor image reflects the portion of the frame visible on the viewer device as a result of said zooming.

12. A method for remotely displaying digital images to at least one viewer device, comprising the steps of:
providing a computer server having a processor, said server digitally linked to provide a first data transfer connection to a presenter device;
providing a second data transfer connection digitally linked to said server, said second data transfer connection configured to communicate via a viewer communications channel with a browser installed on at least one viewer device;
providing a script operating in association with said browser on a processor in said viewer device;
providing presentation software for installation in said presenter device, where said software operates on a processor in said presenter device and enables an operator to select a series of one of more image frames to be transmitted to said at least one viewer device and then transmits said frames from said presenter device to said server, and wherein said presentation software is configurable by an operator to allow the user of a viewer device receiving said frames to remotely control the transmission of image frames by the presenter device using said browser;
operating said processor in said server to establish said first and second data transfer connections in response to an indication that a presenter and viewer desire to interact, and then to receive said frames from the presenter software via said first data transfer connection and transmit said frames to the viewer device via said second data transfer connection, whereby the browser and script in the viewer device display the received frames on a display screen of the viewer device without requiring installation of a separate viewing application; and
electronically receiving information from said viewer device indicating the frame displayed by the viewer device and selectively displaying on the presenter device a monitor image of the frame currently displayed on said viewer device.

13. The method of claim 12 including the further step of configuring the presenter software to display an application operating on the presenter device at the viewer device, and to receive control inputs from the viewer device via the server, whereby a viewer using the viewer device may interact with the application operating on the presenter device.

14. The method of claim 12 wherein said presenter software is configured so that during transmission of an image frame, the software identifies a condition where only a subset of that frame has changed relative to the last frame transmission, and if so, transmits as the next frame only said changed subset of said frame.

15. The method of claim 12 including the further steps of:
electronically receiving information from the viewer device specifying its available screen size and resolution; and
electronically processing image frames received in the server with a first resolution to generate a second, different resolution compatible with the viewer device and transmitting the frames to the viewer device in said second resolution.

16. The method of claim 15 wherein the server dynamically monitors the viewer device rate of acknowledging the transmission of data, and varies at least one of the compression and resolution of the frames transmitted to the viewer device to compensate for bandwidth limitations.

17. The method of claim 12 wherein the presenter software is provided in versions supporting MacOS, iOS, Android, and Microsoft Windows.

18. A method for remotely displaying digital images to at least one viewer device, comprising the steps of:

providing a computer server having a processor, said server digitally linked to provide a first data transfer connection to a presenter device;

providing a second data transfer connection digitally linked to said server, said second data transfer connection configured to communicate via a viewer communications channel with a browser installed on at least one viewer device;

providing a script operating in association with said browser on a processor in said viewer device;

providing presentation software for installation in said presenter device, where said software operates on a processor in said presenter device and enables an operator to select a series of one of more image frames to be transmitted to said at least one viewer device and then transmits said frames from said presenter device to said server, and wherein said presentation software is configurable by an operator to allow the user of a viewer device receiving said frames to remotely control the transmission of image frames by the presenter device using said browser;

operating said processor in said server to establish said first and second data transfer connections in response to an indication that a presenter and viewer desire to interact, and then to receive said frames from the presenter software via said first data transfer connection and transmit said frames to the viewer device via said second data transfer connection, whereby the browser and script in the viewer device display the received frames on a display screen of the viewer device without requiring installation of a separate viewing application; and electronically requesting acknowledgement from said viewer device of receipt of each frame, storing a record of frames acknowledged by said viewer device, and selectively displaying on the presenter device a monitor image of the currently displayed frame on said viewer device.

19. The method of claim 18 wherein the script provided to said viewer device reports to the server indicating panning of the displayed frame on the viewer device, and the displayed monitor image reflects the portion of the frame visible on the viewer device as a result of said panning.

20. The method of claim 18 wherein the script provided to said viewer device reports to the server indicating zooming of the displayed frame on the viewer device, and the displayed monitor image reflects the portion of the frame visible on the viewer device as a result of said zooming.

* * * * *